United States Patent [19]
Johnson

[11] 3,991,571
[45] Nov. 16, 1976

[54] FLUID SYSTEM OF A WORK VEHICLE HAVING FLUID COMBINING MEANS AND SIGNAL COMBINING MEANS

[75] Inventor: Howard L. Johnson, Joliet, Ill.

[73] Assignee: Caterpillar Tractor Co., Peoria, Ill.

[22] Filed: Mar. 15, 1976

[21] Appl. No.: 667,228

[52] U.S. Cl. .................................... 60/422; 60/430; 60/452; 60/486

[51] Int. Cl.[2] ..................... F15B 13/09; F16H 39/46

[58] Field of Search ............. 60/420, 421, 422, 428, 60/430, 445, 444, 451, 452, 486; 91/412; 417/286

[56] References Cited

UNITED STATES PATENTS 3,922,855 12/1975 Bridwell et al. ........................ 60/421

*Primary Examiner*—Edgar W. Geoghegan
*Attorney, Agent, or Firm*—Frank L. Hart

[57] ABSTRACT

A fluid system of work elements of a work vehicle has first and second fluid circuits each having a pump connected to a work element through a control valve assembly that is operated by a pilot pump. A fluid control means is provided for controllably passing fluid between the first and second fluid circuits in response to control signals passing between said circuits.

11 Claims, 5 Drawing Figures

FLUID SYSTEM OF A WORK VEHICLE HAVING FLUID COMBINING MEANS AND SIGNAL COMBINING MEANS

BACKGROUND OF THE INVENTION

In order to reduce power requirements, materials, and labor of a work vehicle having a plurality of fluid pumps serving a plurality of fluid circuits each having at least one work element, it is desirable to provide means for controllably passing fluid between the fluid circuits in response to power demands of said circuits.

This invention therefore resides in a fluid system of work elements of a work vehicle having a pilot pump and first and second fluid circuits. Each of the first and second fluid circuits has a pump connected to a respective work element through a control valve assembly for controlling the flow of fluid from the respective pump to the respective work element and a primary pilot control valve positioned between the pilot pump and the respective control valve assembly for altering a pilot pump signal, delivering a resultant signal, and controlling the operation of the respective control valve assembly in response to said resultant signal. A control means is provided for passing fluid between the first and second fluid circuits. The control means is responsive to said resultant signals from the first and second primary pilot control valves.

A signal means is provided for sensing the load pressure of each circuit and delivering respective first and second control signals to a signal control means. The signal control means controllably combines the first and second control signals as a pump control signal in response to the magnitude of the resultant signals of each circuit. Pump control means associated with each pump receives the pump conrol signal and provides control of said pump output in response thereto.

DETAILED DESCRIPTION OF THE INVENTION

Figure 1:
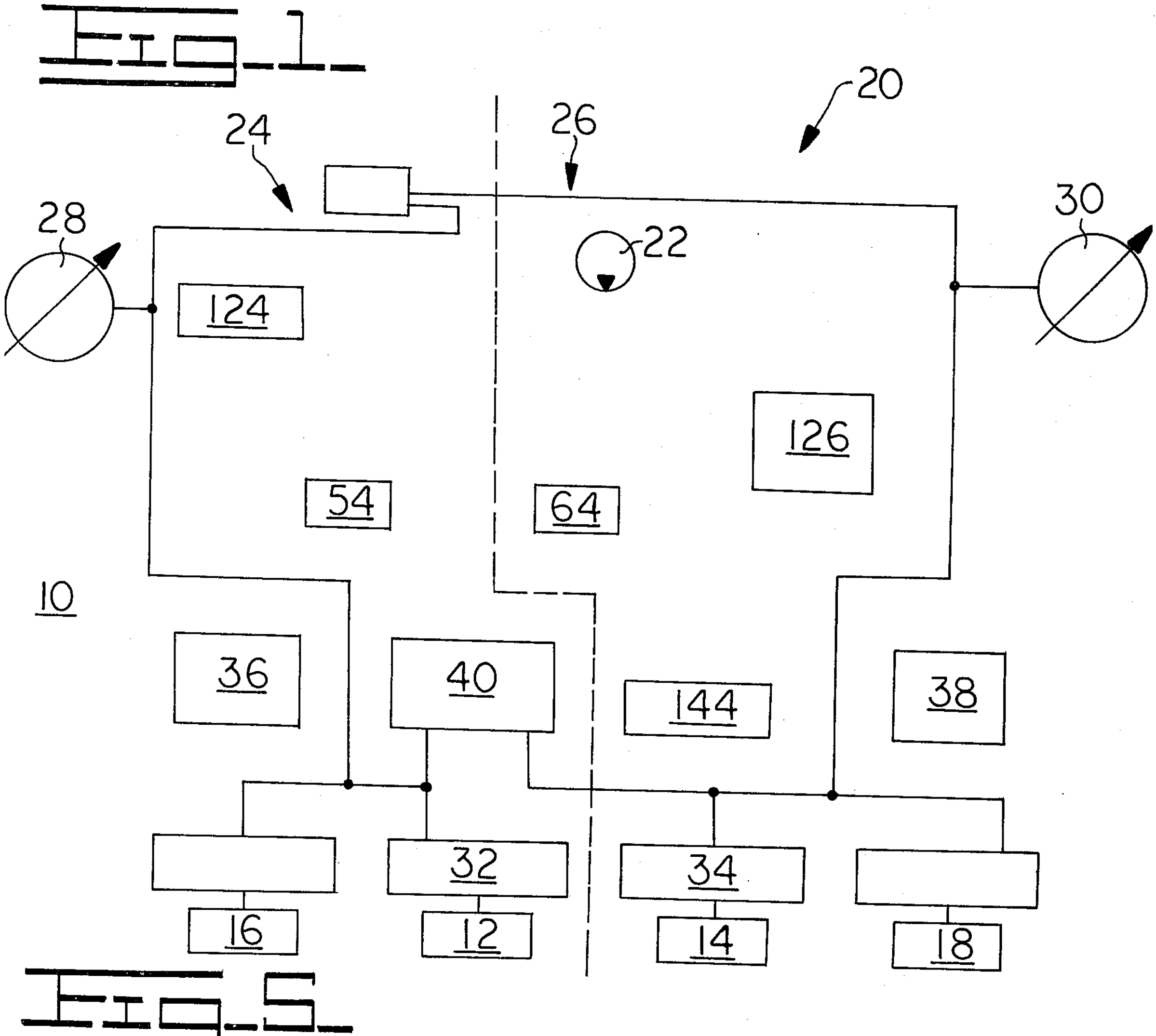
FIG. 1 is a diagrammatic general view of the apparatus of this invention.

Referring to the general view of FIG. 1, a work vehicle 10 has a plurality of work elements 12, 14, 16, 18 operably connected to a fluid system 20, preferably a hydraulic fluid system, of the work vehicle 10. The work vehicle 10, for example an excavator, has a pilot pump 22 and at least first and second fluid circuits 24, 26, as better shown on FIGS. 2 and 3.

Figure 2:
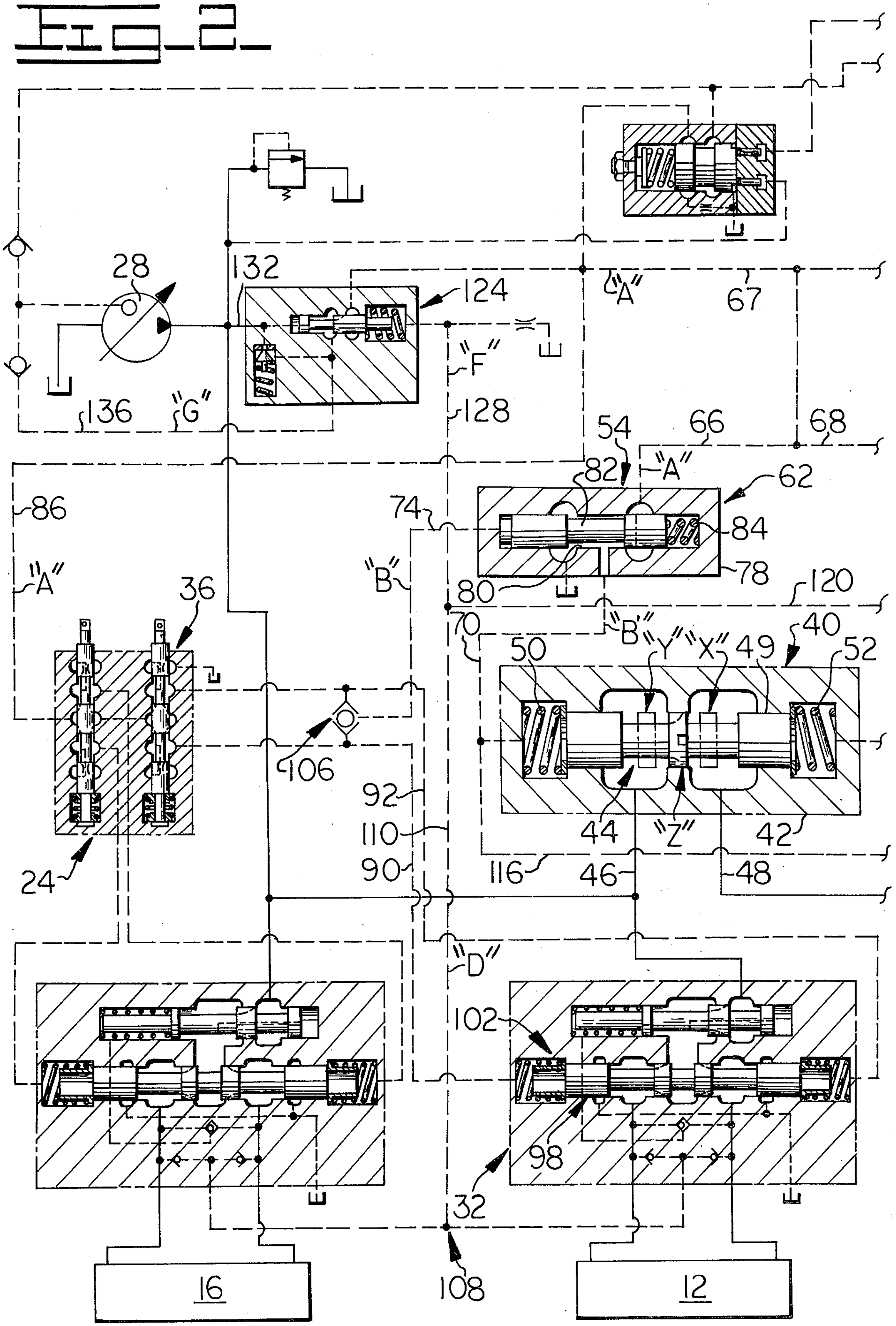
FIG. 2 is a diagrammatic, more detailed view of a first portion of the apparatus of FIG. 1.
Figure 3:
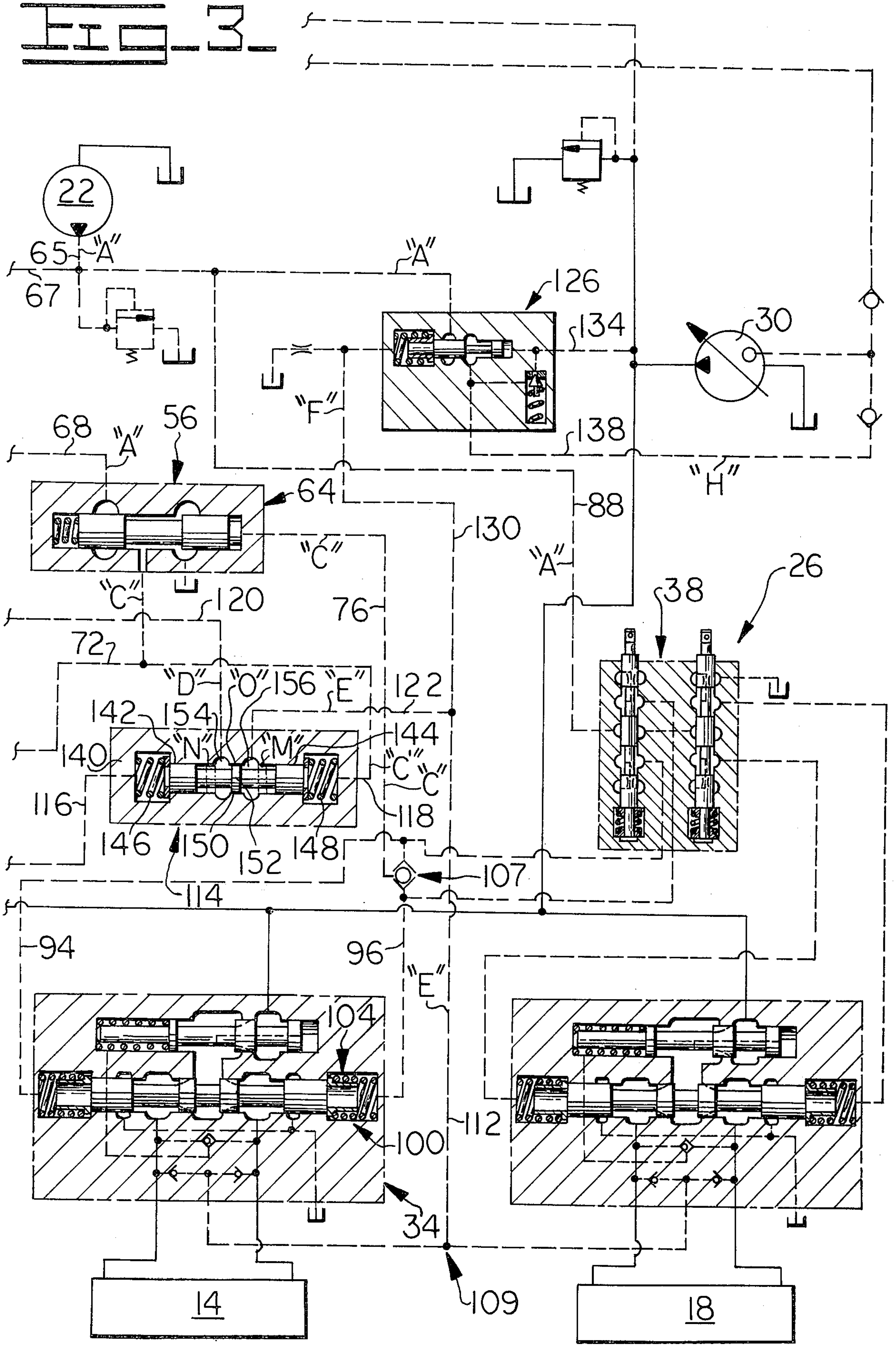
FIG. 3 is a diagrammatic, more detailed view of the remaining portion of the apparatus of FIG. 1.

Referring to FIGS. 2 and 3, each fluid circuit 24, 26 has a fluid pump 28, 30 connected to a respective work element 12, 14 through a control valve assembly 32, 34 for controlling the flow of fluid from the respective pump 28, 30 to the respective work element 12, 14. Each fluid circuit 24, 26 also has a primary pilot control valve 36, 38 positioned between the pilot pump 22 and the respective control valve assembly 32, 34 for altering a constant pilot pump signal A, delivering a respective resultant signal B, C, and generally controlling the operation of the respective control valve assembly 32, 34.

The pumps 28,30 are variable displacement pumps having their outputs controllable in response to a received pressure signal, as is known in the art.

Fluid control means 40 is provided for controllably passing fluid between the first and second fluid circuits 24, 26 at a location between the first and second lumps 28,30 and their respective first ad second control valve assemblies 32,34. The control means 40 is responsive to preselected biasing forces and the resultant signals B, C from the fidrst and second primary pilot control vaves 36,38. As hereinafter more fully described, each of the resultant signals B, C is of a magnitude responsive to the position of the respective primary pilot control valve 36,38.

The fluid control means 40 has a housing 42 having a longitudinally extending chamber 44 that is in fluid communication with the first and second fluid circuits 24,26 via lines 46,48. A fluid control spool 49 is slidably positioned in the chamber 44 for movement between first and second positions X and Y shown by broken lines at which the first and second circuits 24,26 are in communication through the chamber 44 and an intermediate position A shown by solid lines at which the fluid control spool 49 is preventing communication of the first and second circuits 24,26.

Biasing elements 50,52 are positioned at opposed ends of the fluid control spool 49 for urging the spool 49 respectively toward first and second positions X, Y. A first resultant signal means 54 is provided for receiving the first resultant signal B and biasing the fluid control spool 49 toward the first position in response thereto and in opposition to the biasing force of biasng element 52. A second resultant signal means 56 is provided for receiving the second resultant signal C and biasng the fluid control spool 49 toward the second position in response thereto and in opposition to the biasing force of biasing element 50.

Figure 5:
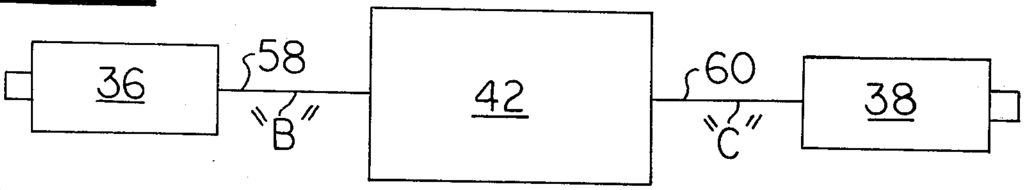
FIG. 5 is a diagrammatic view of another embodiment of the signal means of FIGS. 1–3.

Referring to FIG. 5, each resultant signal means 54, 56 is a conduit 58,60 each connected at one end to the respective primary pilot control valve 36,38 and at the other end to the fluid control means housing 42 adjacent and in fluid communication with an end of the spool 49.

Referring to FIGS. 2 and 3, each of the preferred resultant signal means 54,56 has a secondary pilot control valve 62,64 connected to the pilot pump 22 via lines 65,66,67, 68, to the fluid control means housing 42 adjacent a respective end of the fluid control spool 49 via lines 70,72, and to a respective primary pilot control valve 36,38 via lines 74,76 for receiving respective resultant signals B, C.

The secondary pilot control valves 62,64 are preferably of common construction and only valve 62 will be described for purposes of brevity.

Each secondary pilot control valve has a housing 78 having a chamber 80 in fluid communication with the pilot pump 22 and a respective end of the fluid control means housing 42 via lines 66,70, respectively. A spool 82 is movably positioned in the chmber 80 and has one end in fluid communication with the respective resultant signal B. The spool 82 is movable through the chamber 80 between a first position, shown by broken lines, at which the pilot pump 22 and a respective end of the fluid control means spool 49 are in fluid communication and a second position, shown by solid lines, at which the spool 82 is preventing communication of the pilot pump 22 with said spool 49. A biasing element 84 is provided for urging the spool 82 toward the second position in opposition to the respective resultant signal B.

Each of the secondary pilot control valves alters a pilot signal A in response to its associated biasing force as opposed by its respective resultant signal B or C and delivers respective resultant signals B′ , C′.

The preferred construction of the apparatus of this invention has each primary pilot control valve 36,38 connected to the pilot pump 22 via respective lines 86,88 for receiving signal A. As is known in the art, each primary pilot control valve 36,38 alters signal A and delivers a pair of control signals via respective lines 90,92 and 94,96 to opposed ends of a respective spool 98,100 of a respective directional control valve 102,104 of control valve assemblies 32,34 for the controlled operation thereof. In this construction, the respective resultant signals B, C are each preferably the larger of the respective pair of control signals passing through lines 90,92 and 94,96. A resolver valve 106,107 is connected to each respective line pair 90,92 and 94,96 for providing that the respective resultant signal B, C is the larger of their associated pair of control signals.

As is shown on the drawings, additional work elements 16,18, for example, can be connected to first and/or second fluid circuits 24,26 for operation thereby.

A signal means 108,109 is associated with each circuit 24,26 for sensing the load pressure of each circuit 24,26 and delivering respective first and second control signals D, E in response thereto. These circuit control signals D, E are passed through respective lines 110,120 and 112, 122 to a signal combining means 114.

The signal combining means 114 controllably delivers the larger of said first and second control signals D, E as a pump control signal F in response to the magnitude of said resultant signals B, C (FIG. 5) or B′, C′(FIGS. 2, 3) of each circuit. Lines 116, 118 are connected to respective lines 70, 72 for delivery of signals B′, C′ to the signal control means 114. Resultant signal F of signal combining means is delivered to pump control means 124, 126 of respective pumps 28, 30 via respective lines 120, 128 and 122, 130.

Each pump control means 124, 126 is constructed for receiving the pump control signal F and controlling the output of the respective pump 28, 30 in response thereto. As can be seen in the drawings, the output of each pump 28, 30 is controlled in response to the pilot signal A being altered by the associated pump control means 124, 126 in response to the discharge pressure of the pump as opposed by a preselected biasing force and the signal passing through its respective signal line 128, 130. The discharge pressure passes from the pumps 28, 30 to their associated pump control means 124, 126 through respective lines 132, 134. The resultant pump control signals G, H pass from their pump control means 124, 126 to their respective pump via lines 136, 138. It should be understood, however, that the pump control means 124, 126 can be an integral portion of their respective pumps 28, 30.

Referring to FIG. 3, the signal combining means 114 has a housing 140 having a chamber 142 in fluid communication with the first and second control signals D, E passing through lines 120, 122.

A spool 144 is movably positioned in chamber 142 for movement between first and second positions M, N, shown by broken lines, at which signals D, E are in fluid communication through the chamber 142. At an intermediate position the first and second control signals D, E are free from fluid communication.

First and second biasing elements 146, 148 are positioned at and bias opposed ends of the spool 144.

A first means, for example line 116, is provided for receiving the first resultant signal B or B′ from the first circuit 24 and biasing the spool toward the first position M in response thereto. A second means, for example line 118, is provided for receiving the second resultant signal C or C′ from the second circuit 26 and biasing the spool toward the second position N in response thereto.

The chamber 142 preferably has an annular land 150 on the housing 140 and extending into the chamber 142. An annular flange 152 extends outwardly from the spool 144 and is mateable with the land 150 at the intermediate position of the spool 144. First and second ports 154, 156 open into the chamber on respective opposed sides of the land 150. The ports 154, 156 are in fluid communication with the housing chamber 142 and the respective first and second control signals D, E of lines 120, 122.

Figure 4:
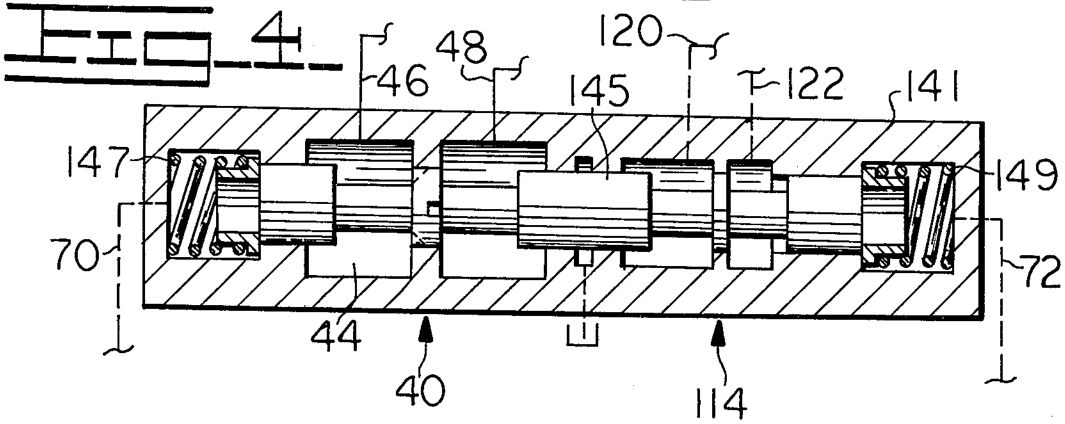
FIG. 4 is a diagrammatic view of another embodiment of the fluid control and signal means of FIGS. 1–3.

Referring to FIG. 4, the fluid control means 40 and signal control means 114 have a common housing 141 and a common spool 145. In this embodiment, the biasing forces are provided by opposed biasing elements 147, 149. This construction is advantageous in saving space in some installations.

In the operation of the apparatus of this invention, the work elements can be a stick 12, boom 14, swing 16, and bucket 18 of an excavator. The magnitude of signal B is responsive to the fluid power demands of the first circuit 24 and the magnitude of signal C is responsive to the fluid power demands of the second circuit 26.

Under fluid demand conditions of both the first and second circuits 24, 26, the spool 49 will be at the intermediate position Z and the fluid from one pump will not be comingled with the fluid from the other pump. However, where there is substantially no fluid demand by one circuit, the spool 49 will be urged toward its first or second position and fluid from the circuit requiring substantially no fluid will pass into the other fluid circuit and assist in supplying its fluid demands.

The apparatus of this invention is further controlled by providing secondary pilot control valves 62, 64 with each circuit. In this construction, signals B and C are used to control a pilot control signal A and controllably pass signal A, in response to the magnitude of respective signals B, C, to the fluid control means 40. Therefore, where the work elements of the associated circuit are demanding fluid, the associated signal B′ or C′ will prevent comingling of fluid between the circuits via control means 40 since full pilot pressure will be maintaining the spool 49 at its intermediate position.

Control signals B′, C′ likewise act on spool 144 to control the passage of signal F to the control apparatus of the pump.

Therefore, when one of the circuits is not demanding fluid, its associated pump will provide fluid through fluid control means 40 to the other circuit and said pump will be controlled in response to signal F that is representative of the fluid demands of said other circuit. However, when both circuits are demanding fluid, fluid control means 40 will prevent comingling of fluid between the circuits and signal control means 114 will prevent signal passage between the circuits. In this intermediate position of spools 49, 144, fluid to the first circuit is provided only by the first pump 28 and the output of that pump 28 is controlled in response to signal D and fluid to the second circuit is provided only by the second pump 30 and the output of that pump 30 is controlled in response to signal E.

Other aspects, objects, and advantages of this invention can be obtained from a study of the drawings, the disclosure, and the appended claims.

What is claimed is:

1. In a fluid system of work elements of a work vehicle having a pilot pump and first and second fluid circuits, each fluid circuit having a pump connected to a respective work element through a control valve assembly for controlling the flow of fluid from the respective pump to the respective work element, a pair of primary pilot control valves each positioned between the pilot pump and a respective control valve assembly for altering a pilot pump signal and delivering resultant signals, and fluid control means for controllably passing fluid between the first and second fluid circuits in response to said resultant signals from the first and second primary pilot control valves, the improvement comprising:

signal means for sensing the load pressure of each circuit and delivering respective first and second control signals;

signal means for controllably delivering the larger of said first and second control signals as a pump control signal in response to the magnitude of said resultant signals of each circuit; and pump control means associated with each pump for receiving the pump control signal and controlling the output of the respective pump in response thereto.

2. Apparatus, as set forth in claim 1, wherein the signal means comprises:

a housing having a chamber in fluid communication with the first and second conrol signals;

a spool being in communication with opposed first and second control signals and being movable through the housing chamber between first and second positions at which the first and second control signals are in fluid communication through the chamber and having an intermediate position at which the first and second control signals are free from fluid communication; and first and second biasing elements positioned at and biasing opposed ends of the spool.

3. Apparatus, as set forth in claim 2, including:

an annular land on the housing and extending into the chamber;

an annular flange on the spool and being mateable with the land at the intermediate position of the spool; and first and second ports positioned on opposed sides of the land and being in fluid communication with the housing chamber and the respective first and second control signals.

4. Apparatus, as set forth in claim 1, wherein the fluid control means comprises:

a housing having a chamber in fluid communication with the first and second fluid circuits;

a fluid control spool movable through the housing chamber between first and second positions at which the first and second circuits are in fluid communication through the chamber and having an intermediate position at which the first and second fluid circuits are free from fluid communication;

a pair of biasing elements positioned at and biasing opposed ends of the spool;

first resultant signal means for receiving the first resultant signal and biasing the spool toward the first position in response thereto; and second resultant signal means for receiving the second resultant signal and biasing the spool toward the second position in response thereto.

5. Apparatus, as set forth in claim 4, wherein each resultant signal comprises:

a conduit connected at one end to the respective primary pilot control valve and at the other end to the fluid control means housing adjacent an end of the fluid control spool.

6. Apparatus, as set forth in claim 4, wherein each resultant signal means comprises:

a secondary pilot control valve connected to the pilot pump, the fluid control means housing adjacent a respective end of the fluid control spool, and to a respective primary pilot control valve for receiving the respective resultant signal.

7. Apparatus, as set forth in claim 6, wherein each secondary pilot control valve comprises:

a housing having a chamber in fluid communication with the pilot pump and a respective end of the control means housing;

a signal control spool having one end in fluid communication with the respective resultant signal and being movable through the chamber between a first position at which the pilot pump and a respective end of the fluid control spool are in fluid communication and a second position at which the pilot pump and fluid control spool are free from fluid communication; and a biasing element urging the signal control valve spool toward the second position in opposition to the resultant signal.

8. Apparatus, as set forth in claim 1, wherein the resultant signal of each primary pilot control valve is the larger of a pair of control signals passing from the respective primary pilot control valve to the respective control valve assembly.

9. Apparatus, as set forth in claim 8, including:

a resolver valve connected to each primary pilot control valve at a location between the primary pilot control valve and the respective control valve assembly and being in communication with said pair of control signals of the primary pilot control valve for providing the resultant signal.

10. Apparatus, as set forth in claim 1, wherein at least one of the fluid circuits has a plurality of work elements.

11. Apparatus, as set forth in claim 1, wherein the fluid control means and the signal means have a common spool and housing.

* * * * *